2,988,526
ANTI-VESICANT COMPOSITIONS AND PRODUCTS TREATED THEREWITH

William W. Prichard, Wilmington, Del., assignor to E. I. du Pont de Nemours and Company, Wilmington, Del., a corporation of Delaware
No Drawing. Filed May 18, 1943, Ser. No. 487,532
14 Claims. (Cl. 260—28.5)

This invention relates to new compositions of matter and more particularly to anti-vesicant compositions, and to treatment of fabrics and clothing therewith.

This application is a continuation-in-part of my application Serial No. 474,629, filed February 3, 1943, now abandoned.

It is known that solutions in organic solvents of tertiary N-chloroureas (compounds containing a carbonyl group attached to two nitrogen atoms in turn attached only to chlorine and carbon) are of value for protecting fabrics and other articles against the penetration of vapors of such vesicants as beta,beta'-dichlorodiethylsulfide, commonly called mustard gas. However, most of the tertiary N-chloroureas have a very limited solubility in organic solvents, and the few usable solvents are toxic, expensive, and unpleasant to employ. Moreover, complicated and expensive solvent recovery systems are needed to handle such solvents safely and economically on a large scale.

Anti-vesicant compositions comprising tertiary N-chloroureas usually contain also a "binder" to cause the tertiary N-chlorourea to adhere to the treated fabric, and in most though not all instances a compound referred to herein as a "stabilizer" to prevent the decomposition products of the tertiary N-chlorourea, or its reaction products with the vesicant, or both, from attacking and weakening the fabric. The use of these compositions in the form of aqueous dispersions to avoid the disadvantages referred to above of organic solvents would be highly desirable. It is very difficult, however, to incorporate the relatively unstable tertiary N-chlorourea, along with these auxiliary components, into a uniform aqueous system which will retain its active chlorine content to an adequate extent for relatively long periods of time, and be practically usable under plant and field conditions. The methods useful for the production of aqueous dispersions of other materials are not generally applicable to the manufacture of satisfactory aqueous dispersions of the tertiary N-chlorourea.

This invention has as an object the manufacture of new and useful compositions of matter. A further object is the preparation of an aqueous dispersion which comprises finely divided tertiary N-chlorourea and which prior to and during its use retains enough of its chlorine to be effective as an anti-vesicant or for other intended purpose which depends upon the chlorine content. A further object is the production of an aqueous dispersion comprising tertiary N-chlorourea and a binder characterized in that, upon application to fabrics, the dispersion does not break and produce "oil spots" and a generally uneven coating. Further objects reside in methods for making the above mentioned dispersions. Still further objects are the treatment of fabrics and cellulosic materials with these dispersions and the production of cloth and clothing resistant to the action of vesicants without substantial loss of tensile strength.

The above objects are accomplished through the methods of compounding the dispersions and through the incorporation therein of certain ingredients as will be more fully disclosed hereinafter.

In the best method for practicing the invention, the tertiary N-chlorourea and stabilizer, if employed, are blended, separately or together, with an aqueous emulsion of a binder and dispersing agent. The dispersing agent which gives best results is polyvinyl alcohol. The preferred binder is a chlorinated paraffin wax, having usually from 41 to 46% chlorine (referred to hereinafter as "chlorowax"). Suitable stabilizers are compounds of cadmium and of elements of atomic number 24 to 30 (chromium, manganese, iron, cobalt, nickel, copper, and zinc) which are substantially non-reactive with the tertiary N-chlorourea under the conditions of formulation. In carrying out this process there are two procedures best suited for the present purpose. One of these procedures consists in preparing an aqueous emulsion of the binder and dispersing agent, and in blending this emulsion with a separately prepared aqueous slurry of the tertiary N-chlorourea, the dispersing agent and the stabilizer, this mixture then being diluted with water as needed which, if desired, can be at the time and place of use. The other procedure, which is the more practical under field conditions, consists in preparing an aqueous emulsion of the binder and all the dispersing agent, and in stirring into this emulsion the finely divided solid tertiary N-chlorourea and stabilizer, admixed or separately in either order, the resulting dispersion being diluted with water as desired.

For best results the tertiary N-chlorourea, prior to incorporation into the aqueous system, should be reduced to a finely divided state, e.g., an average particle size of 10 microns or less. Due to its instability and particle size ordinarily much larger than that desired in the final dispersion, this is a difficult problem in itself, but satisfactory results can be obtained through use of an air micronizer, or by a preliminary wet pebble mill grinding followed by dry disintegration. If the finely divided tertiary N-chlorourea is not to be used for some time, the crude material is desirably micronized or ground with a small amount of the stabilizer.

Referring more particularly to the first of the two previously mentioned procedures for making the present aqueous dispersions, and illustrated more particularly in Examples I to VI below, the finely divided tertiary N-chlorourea is made up into a concentrated, e.g., 30 to 60%, aqueous slurry with about 10% of its weight of stabilizer and from 1 to 10% of its weight of dispersing agent, this being accomplished by ball mill grinding, passing through a centrifugal pump, or similar means. When the dispersing agent is polyvinyl alcohol, it is conveniently employed as a 5 to 10% aqueous solution. The binder is emulsified with water separately in a colloid mill, gear pump, centrifugal pump, or similar turbulent flow device, or this can be accomplished by hand if no special equipment is available. For this emulsification, the proportions of binder, dispersing agent, and water are adjusted in such manner as to give a consistency providing maximum shearing strength for the particular emulsification method being employed, e.g., 5 to 10% polyvinyl alcohol (based on the binder) as a 5% aqueous solution for a colloid mill, as a 7 to 8% aqueous solution for a centrifugal pump, and as a 10% aqueous solution if stirring is by hand. The concentrated slurry and emulsion are then stirred together until a homogeneous blend is obtained, mechanical agitation being desirable though not essential. The resulting mixture is diluted with sufficient water, immediately or at the time and place of use, to give a dispersion containing usually from 2 to 12% of the tertiary N-chlorourea or other desired amount depending upon the surface or kind of material to be treated, and upon the degree of protection needed. This dispersion is suitable for impregnation of fabrics, paper, clothing, etc., to render them resistant to mustard gas, or for application to any surface or article from which a slow, controlled liberation of chlorine over long periods is desired.

The procedure of the foregoing paragraph is specifically illustrated in Examples I to VI. In these and other examples, parts are by weight.

*Example I*

One hundred (100) parts of N,N'-di-(2,4,6-trichlorophenyl)-N,N'-dichlorourea, air-micronized to an average particle size of 2 to 4 microns, and 10 parts of zinc oxide as the stabilizer for the chlorourea, are added to 110 parts of water containing 1.25 parts of polyvinyl alcohol. This mixture is stirred until the solid is wet by the liquid, and the resulting crude slurry is circulated through a centrifugal pump for a period of 10 minutes, whereby a smooth fluid suspension is obtained. A mixture of 75 parts of chlorowax and 37.5 parts of 10% aqueous polyvinyl alcohol solution is stirred vigorously by hand until a smooth paste results. This concentrated emulsion is diluted by the addition of 37.5 parts of water and circulated through a centrifugal pump for 5 minutes. The resulting emulsion is blended with the separately prepared slurry and the mixture diluted with 540 parts of water. The resulting dispersion is suitable for the impregnation of garments, fabrics, and the like.

If the chlorourea of the above example is not preliminarily air-micronized, it should be ground with the zinc oxide and aqueous polyvinyl alcohol in a pebble mill for about 18 hours.

*Example II*

Forty (40) parts of 1,3,4,6-tetrachloro-3a,6a-dimethylglycoluril, 12 parts manganese dioxide ore (86% MnO₂), 1.04 parts of sodium salt of sulfonated naphthalene-formaldehyde condensation product, and water to a total of 200 parts are ground in a ball mill for 15 hours, whereby a fluid, highly dispersed slurry is obtained. Concurrently, an emulsion is prepared as follows: One-tenth (0.1) part of an amine salt of n-dodecyl acid sulfate is dissolved in 89.9 parts of water, and to this is added slowly 89.9 parts of polyvinyl alcohol with constant stirring. The resulting mixture is heated on a steam bath at 80°–85° C. with constant stirring until a clear homogeneous solution is obtained. This solution is then diluted with water in amount sufficient to produce a 5% solution of the polyvinyl alcohol. Two (2) parts of this solution and 1 part of chlorowax are heated to a temperature of 70° C., then mixed by hand to form a crude emulsion, followed by passage through a colloid mill to form a stable emulsion containing 33⅓% of chlorowax and polyvinyl alcohol in amount equal to 10% of the chlorowax. One hundred twenty (120) parts of this emulsion is mixed thoroughly with 200 parts of the above slurry to form the final dispersion. This dispersion, which is dark in color due to the manganese dioxide, is uniform and does not separate into its components to any appreciable degree on standing. Any material which settles out after standing for appreciable periods of time can be readily redispersed. This dispersion is well suited for impregnation of fabrics and other porous cellulosic materials.

*Example III*

Sixty (60) parts of the tertiary N-chlorourea of Example I, 6 parts of zinc oxide, and 1 part of the sodium salt of a sulfonated naphthalene-formaldehyde condensation product are ground for 18 hours in a pebble mill in the presence of 178 parts of water. A fluid, highly dispersed slurry results. An emulsion of chlorowax is prepared by passing a mixture of 45 parts of the wax, 89 parts of water, and 1 part of sodium salt of sulfonated naphthalene-formaldehyde condensation product through a colloid mill. The slurry and the emulsion are then stirred together and diluted with 100 parts of water to give a stable, homogeneous impregnating suspension suitable for application to clothing and paper.

*Example IV*

Ten (10) parts of 1,3,4,6-tetrachloro-3a,6a-diphenylglycoluril, 2 parts of zinc oxide, and 0.2 part sodium salt of sulfonated naphthalene-formaldehyde condensation product are ground together in a pebble mill for 4 hours in the presence of 70 parts of water. The resulting dispersion is blended with a separately prepared emulsion containing 7.5 parts of chlorowax, 0.75 part of polyvinyl alcohol, and 13.25 parts of water. The composition obtained is suitable for the treatment of garments, fabrics, and the like.

*Example V*

One hundred (100) parts of finely divided 1,1'-methylene-bis-(3-chloro-5,5-dimethylhydantoin), 20 parts of zinc oxide, 3 parts of sodium salt of sulfonated naphthalene-formaldehyde condensation product, and 150 parts of water are stirred in a drink mixer for 10 to 15 minutes, or until a uniform slurry is obtained. This aqueous slurry is blended with a separately prepared emulsion of 100 parts of chlorowax, 200 parts of a 5% aqueous solution of polyvinyl alcohol, and 2 parts of sodium salt of sulfonated napthalene-formaldehyde condensation product, the resulting blend being diluted with 90 parts of water and stirred well. The 15% aqueous dispersion thus obtained is suitable for impregnation of heavy fabrics to prevent passage of mustard vapor therethrough. The treated fabrics show excellent retention of active chlorine and tensile strength when stored for a month or more under simulated tropical conditions of temperature and humidity.

*Example VI*

A mixture of 48 parts of 1,3,4,6-tetrachloro-3a-methyl-6a-phenylglycoluril, 4.8 parts of zinc oxide, and 0.96 part of sodium salt of sulfonated naphthalene-formaldehyde condensation product is ground in a pebble mill in the presence of 190 parts of water for 6 hours. The resulting aqueous dispersion is blended with a separately prepared emulsion of 36 parts of chlorowax and 3.6 parts of water-soluble polyvinyl alcohol in 68.4 parts of water. The uniform dispersion thus obtained is adapted for the impregnation of paper, garments, fabrics, and the like.

In the second general method for compounding previously referred to, wherein the tertiary N-chlorourea and stabilizer usually employed are added in solid from to an aqueous emulsion of the binder and dispersing agent, the latter emulsion is made up as in the first method. The tertiary N-chlorourea and stabilizer should be in finely divided form, i.e., an average particle size of about 10 microns or less, and they can be admixed before addition to the emulsion or added separately in either order, according to convenience. Since the emulsion will normally be fairly concentrated, a more or less stiff, doughy paste usually is obtained. This should be worked well, preferably in a suitable mechanical mixer though it can be done by hand, until no solid aggregates are present, after which it is diluted with water in small separate portions util the desired strength is obtained. The following example illustrates this method:

*Example VII*

Seventy-five (75) parts of chlorowax is stirred by hand with 37.5 parts of 10% aqueous polyvinyl alcohol solution until a smooth paste results. This concentrated oil-in-water emulsion is then diluted with 37.5 parts of water. One hundred (100) parts of N,N' di-(2,4,6-trichlorophenyl)-N,N'-dichlorourea, pre-ground to an average particle size of 3 to 5 microns, is shaken with 10 parts of zinc oxide (average particle size of ½ to 1 micron) until well mixed, and the mixture worked into the chlorowax emulsion. A stiff doughy paste results. This is worked mechanically until any aggregates present in the chlorourea powder are thoroughly dispersed, after which it is diluted with 20 parts of water and stirred vigorously with a paddle for an additional 20 minutes. This concentrated suspension is further diluted slowly with 520 parts of water to form a uniform dispersion of suitable strength for impregnation of clothing.

In instances where the aqueous dispersion is not to be applied to a fabric or other cellulosic material, or in which retention of tensile strength in the fabric for long periods is of minor importance, the stabilizer can be omitted. The following example is illustrative:

*Example VIII*

Into an open aluminum mixing tank with bottom outlet and "Lightnin" stirrer mounted on the rim is placed 50 parts of 10% aqueous polyvinyl alcohol solution. To this solution 75 parts of chlorowax is added at a uniform rate over a period of about 20 minutes, stirring being continued for 30 minutes thereafter. This crude emulsion is diluted with 40 parts of water and passed twice through a centrifugal pump, the discharge being throttled so that about 45 minutes is required per pass. To the resulting fine emulsion 70 parts of water and 100 parts of solid air-micronized tertiary N-chlorourea of Example I are added slowly, stirring being continued until all the solid is completely wetted and the dispersion uniform. This concentrated dispersion is circulated through a centrifugal pump for 15 minutes and then diluted with water to the desired extent, usually 2 to 12% solids, depending upon the purpose for which it is intended. Fabrics impregnated therewith resist passage of mustard gas vapor, retain their active chlorine to an adequate extent for long periods, and are resistant to laundering.

Polyvinyl alcohol is such a highly valuable component of the present aqueous dispersions that it is possible to prepare with it useful dispersions from which the binder, or both binder and stabilizer, are omitted. Such dispersions are useful for application to fabrics as anti-vesicants when washfastness is not an objective. The following example illustrates such a dispersion:

*Example IX*

One hundred (100) parts of the air-micronized tertiary N-chlorourea of Example I and 5 parts of solid, finely divided polyvinyl alcohol are mixed intimately. Twenty (20) parts of water is added, and the mixture is triturated until a uniform pasty mass is obtained. This paste is then diluted with 675 additional parts of water, whereby an aqueous dispersion containing about 12.5% solids is obtained. This dispersion is suitable for use as an anti-vesicant composition, for which latter purpose it can be applied to fabrics. The impregnated fabric does not exhibit objectionable boardiness or crocking, and it resists passage of mustard gas vapor as well as fabrics impregnated with similar dispersions containing a binder and a stabilizer. Under both temperate and tropical conditions of temperature and humidity, retention of active chlorine and tensile strength are quite good even though no stabilizer is present, there being, e.g., no detectable loss in tensile strength after outdoor exposure for two months in Florida.

The impregnation of the fabric or other article can be effected by different means depending on the nature of the material treated. If the object or surface to be treated is stationary, the aqueous dispersion can be applied by spraying or brushing, or with an absorbent material such as a sponge. If, as is more frequently the case, the material to be impregnated is a movable or flexible article, e.g., paper or fabric, it is simply immersed in the aqueous dispersion and squeezed or wrung out until the desired amount of impregnant is left on the cloth. The damp fabric is then allowed to dry, after which it is ready for use. For mechanical impregnations, it is satisfactory to employ equipment ordinarily used for dry-cleaning purposes and consisting essentially of a perforated rotating cylinder with the necessary attached shell, centrifuge, and rotary tumbling drier. In either case, the impregnated fabrics are on the average at least 50% more resistant to passage of mustard gas vapor than are fabrics impregnated with the same amount of tertiary N-chlorourea from an organic solvent medium. The following example is illustrative:

*Example X*

A weighed amount of cotton twill of the kind used in military uniforms is immersed in a dispersion prepared as in Example VII, allowed to soak 3 to 4 minutes, and the excess liquid removed by wringing until the weight of the wet fabric is twice the original dry weight. The wet fabric is then spread out and allowed to dry at room temperature, or it can be force dried at temperatures below about 120° C. This fabric is uniformly impregnated with the tertiary N-chlorourea in an amount sufficient to give 0.4 mg. active chlorine/sq. cm., as shown by titration of the iodine liberated from potassium iodide by a sample of known area. When tested for resistance to mustard vapor under carefully controlled conditions, 476 minutes was required before a standard amount of mustard vapor penetrates the fabric, this representing a protective efficiency of 1190 minutes per mg. of active chlorine present. The average of a number of control fabrics, containing 0.5 mg. active chlorine/sq. cm. and prepared by immersion of the fabric in tetrachloroethane solution of the same tertiary N-chlorourea and chlorinated paraffin wax under the same conditions, resisted the passage of mustard vapor for only 275 minutes, i.e., 550 minutes per mg. of active chlorine present.

The polyvinyl alcohol employed as a dispersing agent in the practice of this invention can be any water-soluble, completely or partially hydrolyzed polyvinyl ester. The preferred type is a highly viscous, partially hydrolyzed polyvinyl acetate having a saponification number of about 130 to 160. Polyvinyl alcohol is especially valuable because of its general applicability to the preparation, by methods ranging from the very crude to the highly refined, of aqueous tertiary N-chlorourea dispersions, based on salt or fresh water of whatever purity is available, and containing practically any kind, amount, and purity of auxiliary component chosen for the particular formulation and purpose. Moreover, in the usual composition containing stiff thick binders such as chlorowax, polyvinyl alcohol gives, especially in the approximate aqueous concentrations heretofore mentioned for particular mixing methods, a viscosity adequate to break up and disperse or emulsify the chlorowax. In this way it contributes greatly to the physical stability of the dispersion. This has important practical significance in that, when such dispersions are applied to fabrics, the chlorowax remains emulsified and the fabric can be evenly coated without a mottled appearance or the effect of oil spotting. Other non-ionic, polyhydroxylated polymeric protective colloids, while of less general applicability, can also be employed as dispersing agents, among them dextrin, starch, methyl starch, starch acetate, flour paste, incompletely methylated celluloses, and certain vegetable gums such as gum arabic, gum tragacanth, "Galagum," and "Lupogum."

In compositions in which binders are not included, the alkali metal salts of sulfonated naphthalene-formaldehyde condensation products, such as those having the trade names "Daxad-11," "Tamol-NNO," "Darvan-1," "Foamapin," and "Fastan Niocet," are also highly effective dispersing agents, giving results practically equivalent to polyvinyl alcohol. In fact, in any type of aqueous dispersion containing a tertiary N-chlorourea and a stabilizer which is a compound of an element of atomic number 24 to 30, especially zinc compounds and in particular zinc oxide, an alkali metal salt of a sulfonated naphthalene-formaldehyde condensation product is desirably included, whatever the other components of the dispersion. Such compositions show greater retention of chlorine and protect fabrics longer against loss of tensile strength than do analogous compositions not containing alkali metal salts of sulfonated naphthalene-formaldehyde condensation products.

This invention is applicable to N-chloroureas in which the nitrogens are tertiary, i.e., hydrogen-free, and in which at least one of the nitrogen atoms is joined to a chlorine atom. The carbons directly attached to the urea nitrogens should preferably also be hydrogen-free since this type of tertiary N-chlorourea has less tendency toward rearrangement to a different compound. Also for reasons of stability, the tertiary N-chlorourea should preferably be polycyclic. Illustrative of these classes are the bicyclic compounds known as N-chloroglycolurils, which are derived from urea and alpha,beta-diketones and have the following structure wherein R and R' are the ketone residues:

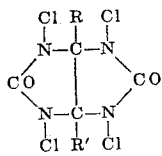

These compounds combine a high percentage of "active" chlorine with relatively high stability against rearrangement. Specific tertiary N-chloroureas which can be used instead of those of the examples are:

N,N-di-(2,6-dimethylphenyl)-N,N'-dichlorourea,
N,N'-di-(2,6-dichlorophenyl)-N,N'-dichlorourea,
N,N-diphenyl-N'-chloro-N'-(2,6-dimethylphenyl)urea,
1,3,4,6 - tetrachloro - 5 - imino - 3a,6a - dimethylglycoluril,
5,5-dimethyl-1,3-dichlorohydantoin,
5-methyl-5-isobutyl-1,3-dichlorohydantoin,
1,3,5-trichloro-s-triazinetrione, and
1,1' - methylene - bis - (3 - chloro - 5 - methyl - 5 - isobutylhydantoin).

The stabilizers mentioned herein which are ordinarily though not necessarily employed in the present aqueous dispersions are materials which act to retard or prevent the chemical changes taking place in the impregnated fabric which cause it to be attacked and weakened. They usually also act to retard loss of active chlorine from the tertiary N-chlorourea itself. An outstanding agent for the first mentioned purpose is zinc oxide which, in my copending application Serial No. 474,629, filed February 3, 1943, is claimed specifically in tertiary N-chlorourea compositions, aqueous and otherwise. Also useful as stabilizing agents are manganese acetate, carbonate, naphthenate, and hydroxide; zinc carbonate, naphthenate, and salicylate; chromium acetate; cobalt acetate, carbonate, naphthenate, and hydroxide; nickel hydroxide and nickel octyl phthalate; ferric hydroxide and ferrite yellow; and cadmium oxide, acetate, and salicylate. Mixtures of these compounds can be used. Compounds of zinc and manganese are preferred, as are oxides, carbonates, acetates, and naphthenates of all the elements of the atomic number 24 to 30 inclusive. The amount of the stabilizer can be as little as 1% based on the tertiary N-chlorourea, or 100% or even higher, depending upon the amount of tertiary N-chlorourea employed and its active chlorine content, and upon practical considerations arising from the use to which the composition is to be put, i.e., for preparation of gas resistant fabrics or other use, and if the former, the anticipated time and severity of exposure to the vesicant.

A binder, although not essential, is desirably employed. For this purpose there can be used any substantially non-volatile, usually water-insoluble material which is a solvent for the vesicant, is non-reactive toward the tertiary N-chlorourea, and preferably is a highly viscous liquid or semi-solid at room temperature. Suitable binders in addition to the chlorowax of the examples are polyisobutylene, chlorinated polyisobutylene, mineral oil, polyvinylchloroacetate, and chlorinated stearic acid.

Various other components can be added to the aqueous dispersion as needed and desired in special instances, among them textile waterproofers, adhesives to enhance washfastness, anti-foam agents such as coconut oil alcohols, and pigments and dyes to produce any desired color, e.g., yellow iron oxide, certain chromites, phthalocyanines, or anthraquinone dyes.

Other method of fabric or paper treatment include precoating with an aqueous emulsion of the stabilizer, then coating with an aqueous dispersion of the tertiary N-chlorourea; treatment first with an aqueous dispersion of the stabilizer and tertiary N-chlorourea, then with the binder in aqueous or organic medium; impregnation of the fabric with an organic solvent solution of the binder, followed by treatment with an aqueous dispersion of the tertiary N-chlorourea; and printing of a mixture of stabilizer and tertiary N-chlorourea onto the fabric or paper from suitable aqueous printing pastes.

As previously noted, the dispersions of tertiary N-chlorourea described herein are uniform, adequately permanent, and practically usable under plant and field conditions. Any of the tertiary N-chlorourea that settles from the dispersion is easily redispersed by simple stirring. Tendering or deterioration of the treated fabric from decomposition products of the tertiary N-chlorourea, or from its reaction products with the vesicant, is avoided. The treated fabric retains its permeability to air, without which it would be of little or no value as clothing.

After these dispersions have been stored for long periods under ordinary atmospheric conditions, the tertiary N-chlorourea therein contains titratable chlorine in amount not substantially different from the dry solid finely divided material after storage for the same period of time and under the same conditions of temperature and humidity. More specifically, the tertiary N-chlorourea present in the aqueous dispersions of this invention retains at least 75% of its active chlorine after the dispersions have been stored for 3 months under ordinary atmospheric conditions; in fact, the chlorine retention is usually above 90% for periods much longer than this, e.g., at least 8 months. The following table shows the results obtained in tests with aqueous dispersions containing typical tertiary N-chloroureas, polyvinyl alcohol, and other materials, after aging for various periods under atmospheric conditions of temperature and humidity.

| Chlorourea of Example | Composition in Parts by Weight | | | | Approx. Percent Solids | Aging Period, Months, and Days | Percent Chlorine Retained | Dry Solid Chlorourea | |
|---|---|---|---|---|---|---|---|---|---|
| | Chlorourea | Chlorowax | Stabilizer (ZnO) | PVA | | | | Aging Period, Months and Days | Percent Chlorine Retained |
| I | 100 | 75 | 0 | 17.5 | 25 | 3 and 16 | 90.3 | 8 and 0 | 92.3 |
| I | 100 | 75 | 5 | 17.5 | 26 | 3 and 19 | 91.2 | 8 and 0 | 92.3 |
| I | 100 | 75 | 10 | 17.5 | 27 | 7 and 18 | 93.0 | 8 and 0 | 92.3 |
| II | 100 | 0 | 70 | 10.0 | 29 | 8 and 27 | 75.3 | 8 and 22 | 100.0 |
| IV | 100 | 0 | 20 | 12.0 | 30 | 7 and 22 | 100.0 | 7 and 22 | 99.2 |
| V | 100 | 100 | 20 | 18.9 | 30 | 1 and 25 | [1] 100.0 | 2 and 7 | 95.7 |

[1] Retained sample from fabric impregnation.

In addition to impregnation of clothing to protect the wearer against the action of vesicant gases, the aqueous dispersions of this invention can also be used for gas-decontamination and neutralization purposes generally against such vesicants as mustard gas and "lewisite." They can be used in the form of ointments for application to the skin, or they can be scattered as a slurry over an area which has been contaminated with the gas.

While these aqueous dispersions are designed principally for use as anti-vesicants and specifically for preparation of gas-protective clothing, they may also be used to treat other cellulosic webs, such as paper, and other kinds of cellulosic materials or manufactures therefrom, such as regenerated cellulose fibers and films, cotton, cellulose derivatives, wooden surfaces, and the like. From such treated materials may be made bandages having a long effective life, wall paper for hospitals and similar buildings, and coverings for any surface or area from which slow, controlled evolution of chlorine is desired. Other uses of this type will suggest themselves to those skilled in the art and are included within the scope of the invention.

As many apparently widely different embodiments of this invention may be made without departing from the spirit and scope thereof, it is to be understood that I do not limit myself to the specific embodiments thereof except as defined in the appended claims.

I claim:

1. A uniform aqueous dispersion of a finely divided tertiary N-chlorourea, and, as a dispersing agent, a polyhydroxylated non-ionic polymeric material.

2. A uniform aqueous dispersion of a finely divided tertiary N-chlorourea, a binder, and, as a dispersing agent, a polyhydroxylated non-ionic polymeric material, said binder being a substantially non-volatile material which is non-reactive with said N-chlorourea.

3. A dispersion according to claim 1 in which the dispersing agent is polyvinyl alcohol.

4. A dispersion according to claim 2 in which the dispersing agent is polyvinyl alcohol.

5. A dispersion according to claim 2 in which the dispersing agent is polyvinyl alcohol and the binder is chlorinated paraffin wax.

6. A uniform, aqueous dispersion of a finely divided tertiary N-chlorourea, a dispersing agent comprising polyhydroxylated non-ionic polymeric material, and, as a stabilizer, a compound of an element of atomic number 24 to 30 inclusive, which is non-reactive with said tertiary N-chlorourea.

7. A dispersion according to claim 6 in which the dispersing agent is polyvinyl alcohol.

8. A dispersion according to claim 6 in which the dispersing agent comprises polyvinyl alcohol and an alkali metal salt of sulfonated naphthalene-formaldehyde condensation product.

9. A process for preparing an aqueous dispersion of a tertiary N-chlorourea, said process comprising blending an aqueous emulsion of a binder and a dispersing agent with a finely divided tertiary N-chlorourea and a compound of an element having an atomic number of from 24 to 30 inclusive, which is non-reactive with said tertiary N-chlorourea, said dispersing agent comprising polyhydroxylated non-ionic polymeric material, said binder being a substantially non-volatile material which is non-reactive with said N-chlorourea.

10. The process set forth in claim 9 in which said dispersing agent is polyvinyl alcohol.

11. A uniform, aqueous dispersion of a finely divided tertiary N-chlorourea, a dispersing agent comprising polyhydroxylated non-ionic polymeric material, a binder, and as a stabilizer, a compound of an element of atomic number 24 to 30 inclusive which is non-reactive with said tertiary N-chlorourea, said binder being a substantially non-volatile material which is non-reactive with said N-chlorourea.

12. The dispersion defined in claim 11, in which the dispersing agent is polyvinyl alcohol, and the binder is chlorinated paraffin wax.

13. A process for preparing an aqueous dispersion of a tertiary N-chlorourea, said process comprising blending (a) an aqueous emulsion of a binder containing as a dispersing agent, a polyhydroxylated non-ionic polymeric material, with (b) an aqueous slurry of finely divided tertiary N-chlorourea containing a dispersing agent comprising an alkali metal salt of a sulfonated naphthalene-formaldehyde condensation product, and a compound of an element having an atomic number of from 24 to 30 inclusive which is non-reactive with said tertiary N-chlorourea, said binder being a substantially non-volatile material which is non-reactive with said N-chlorourea.

14. Cellulosic material which contains a tertiary N-chlorourea and polyvinyl alcohol, and which is resistant to penetration by mustard gas.

References Cited in the file of this patent

UNITED STATES PATENTS

| | | |
|---|---|---|
| 1,839,168 | Stampe | Dec. 29, 1931 |
| 1,968,769 | Bertsch | July 31, 1934 |
| 2,057,999 | Bowlby | Oct. 30, 1936 |
| 2,127,320 | Alt | Aug. 16, 1938 |

FOREIGN PATENTS

| | | |
|---|---|---|
| 496,734 | Great Britain | Dec. 5, 1938 |
| 557,081 | Germany | Aug. 18, 1932 |
| 588,131 | Germany | Nov. 13, 1933 |

OTHER REFERENCES

Polyvinyl Alcohol—"Properties, Uses, and Applications"—and R & H Technical Bulletin—E. I. du Pont de Nemours & Co., Inc. Copyright 1940.

Ind. Eng. Chem., vol. 33, No. 1, January 1941, pp. 16–21, "Surface-Active Agents."

UNITED STATES PATENT OFFICE

CERTIFICATE OF CORRECTION

Patent No. 2,988,526

June 13, 1961

William W. Prichard

It is hereby certified that error appears in the above numbered patent requiring correction and that the said Letters Patent should read as corrected below.

Column 3, lines 50 and 51, after "chlorowax" insert -- used --; column 4, line 46, for "from" read -- form --; column 7, line 28, for "N,N-di-" read -- N,N'-di- --; column 8, line 23, for "method" read -- methods --; column 10, line 43, for "1,968,769" read -- 1,968,796 --; same column 10, line 53, for "and" read -- an --.

Signed and sealed this 19th day of December 1961.

(SEAL)
Attest:

ERNEST W. SWIDER
Attesting Officer

DAVID L. LADD
Commissioner of Patents
USCOMM-DC